United States Patent
Kaul et al.

(10) Patent No.: US 11,537,724 B2
(45) Date of Patent: Dec. 27, 2022

(54) GENERATING DATA MIGRATION PLAN FOR IN-PLACE ENCRYPTION OF DATA

(71) Applicant: International Business Machines Corporation, Armonk, NY (US)

(72) Inventors: Akshar Kaul, Bangalore (IN); Diptikalyan Saha, Bangalore (IN); Gagandeep Singh, Bangalore (IN); Manish Kesarwani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 16/364,926

(22) Filed: Mar. 26, 2019

(65) Prior Publication Data

US 2020/0311287 A1    Oct. 1, 2020

(51) Int. Cl.
*G06F 21/60* (2013.01)
*G06F 16/2455* (2019.01)
*G06F 16/22* (2019.01)

(52) U.S. Cl.
CPC ............ *G06F 21/602* (2013.01); *G06F 16/22* (2019.01); *G06F 16/2455* (2019.01)

(58) Field of Classification Search
CPC .... G06F 21/602; G06F 16/22; G06F 16/2455; G06F 16/214; G06F 2221/2107
See application file for complete search history.

(56) References Cited

U.S. PATENT DOCUMENTS

| | | | |
|---|---|---|---|
| 6,185,304 B1* | 2/2001 | Coppersmith | H04L 9/002 380/37 |
| 6,189,095 B1* | 2/2001 | Coppersmith | H04L 9/002 380/37 |
| 6,978,367 B1* | 12/2005 | Hind | H04L 63/20 705/76 |
| 7,689,837 B2* | 3/2010 | Taguchi | H04L 9/00 713/193 |
| 8,275,996 B1* | 9/2012 | Melvin | G06F 21/85 713/189 |
| RE44,364 E * | 7/2013 | Cristy | H04L 63/166 713/150 |

(Continued)

FOREIGN PATENT DOCUMENTS

CN        103902593 B     7/2014

*Primary Examiner* — Aravind K Moorthy
(74) *Attorney, Agent, or Firm* — Ryan, Mason & Lewis, LLP (57) ABSTRACT

Methods, systems, and computer program products for generating a data migration plan for in-place encryption of data are provided herein. A computer-implemented method includes receiving, from a user, a request to generate a migration plan for performing in-place encryption of data within a database, wherein the migration plan indicates periods of time in which portions of the data are to be encrypted; determining a set of constraints for performing the in-place encryption; generating the migration plan based at least in part on the set of constraints; and performing the in-place encryption of the data in accordance with the migration plan such that only a single copy of each of the portions is maintained during the in-place encryption, wherein the single copy comprises one of a plaintext copy of data corresponding to the portion, and an encrypted copy of data corresponding to the portion.

20 Claims, 6 Drawing Sheets

(56) References Cited

U.S. PATENT DOCUMENTS

| | | | |
|---|---|---|---|
| 8,503,680 B1* | 8/2013 | Clifford | H04L 9/088 713/193 |
| 8,812,875 B1* | 8/2014 | Melvin | H04L 9/0897 713/193 |
| 9,021,163 B1* | 4/2015 | Czarny | G06F 21/6218 710/68 |
| 9,081,771 B1* | 7/2015 | Faibish | G06F 16/1752 |
| 9,336,092 B1* | 5/2016 | Li | G06F 21/6209 |
| 9,483,486 B1* | 11/2016 | Christiaens | G06F 3/067 |
| 9,684,593 B1* | 6/2017 | Chen | G06F 12/0811 |
| 9,712,503 B1* | 7/2017 | Ahmed | G06F 21/606 |
| 9,773,118 B1* | 9/2017 | Bennett | G06F 21/60 |
| 9,779,269 B1* | 10/2017 | Perlman | G06F 16/24556 |
| 9,959,049 B1* | 5/2018 | Armangau | G06F 3/0608 |
| 10,003,584 B1* | 6/2018 | Roth | H04L 63/068 |
| 10,083,293 B1* | 9/2018 | Gazula | G06F 21/10 |
| 10,182,038 B2* | 1/2019 | Einarsson | H04L 67/02 |
| 10,303,895 B1* | 5/2019 | McCluskey | H04L 9/0894 |
| 10,430,350 B1* | 10/2019 | Nimry | H04L 9/0894 |
| 10,430,599 B1* | 10/2019 | Whitmer | G06F 16/152 |
| 10,572,271 B1* | 2/2020 | Tsirkin | G06F 9/45558 |
| 10,628,073 B1* | 4/2020 | Zhao | G06F 3/0608 |
| 10,649,974 B1* | 5/2020 | Marelas | G06F 16/28 |
| 10,922,132 B1* | 2/2021 | Shiramshetti | G06F 21/53 |
| 10,977,383 B2* | 4/2021 | Dageville | G06F 21/6227 |
| 11,016,954 B1* | 5/2021 | Babocichin | G06F 16/258 |
| 11,290,432 B2* | 3/2022 | Tav | G06F 21/6245 |
| 11,294,901 B1* | 4/2022 | Yue | G06F 16/24542 |
| 2004/0095595 A1* | 5/2004 | Jacobsen | G06F 21/608 358/1.14 |
| 2006/0026012 A1* | 2/2006 | Campbell | G06Q 10/10 702/182 |
| 2007/0079386 A1* | 4/2007 | Metzger | G06F 21/6227 726/29 |
| 2008/0320319 A1* | 12/2008 | Muller | G06F 21/6209 713/193 |
| 2010/0303241 A1* | 12/2010 | Breyel | G06F 21/602 380/29 |
| 2011/0119407 A1* | 5/2011 | Shah | G06F 9/5016 710/6 |
| 2011/0145560 A1* | 6/2011 | Moon | H04N 21/2347 713/150 |
| 2012/0047492 A1* | 2/2012 | Huang | G06F 8/60 717/128 |
| 2012/0278227 A1* | 11/2012 | Kolo | G06Q 40/02 705/38 |
| 2013/0144901 A1* | 6/2013 | Ho | G06F 16/248 707/769 |
| 2013/0159700 A1* | 6/2013 | Nakagawa | G06F 21/78 713/155 |
| 2013/0159725 A1* | 6/2013 | Koo | H04L 9/3226 713/189 |
| 2013/0339750 A1* | 12/2013 | Amit | G06F 21/602 713/189 |
| 2014/0281545 A1* | 9/2014 | Erofeev | G06F 21/6218 713/171 |
| 2015/0019488 A1* | 1/2015 | Higginson | G06F 16/214 707/634 |
| 2015/0040235 A1* | 2/2015 | Byrne | H04L 63/0281 726/26 |
| 2016/0078245 A1* | 3/2016 | Amarendran | G06N 20/00 713/193 |
| 2016/0098568 A1* | 4/2016 | Bushman | G06F 3/065 713/189 |
| 2016/0294549 A1* | 10/2016 | Qian | H04L 9/0822 |
| 2016/0357736 A1 | 12/2016 | Schuenzel et al. | |
| 2016/0357799 A1* | 12/2016 | Choi | G06F 21/6245 |
| 2016/0378998 A1* | 12/2016 | Brintalos | G06F 21/602 380/278 |
| 2017/0053122 A1* | 2/2017 | Rueger | G06F 21/6227 |
| 2017/0222992 A1* | 8/2017 | Adler | H04L 9/0841 |
| 2017/0286412 A1 | 10/2017 | Mohanty et al. | |
| 2017/0286698 A1* | 10/2017 | Shetty | G06F 21/6218 |
| 2017/0289115 A1* | 10/2017 | Lessiak | H04B 5/0031 |
| 2018/0109501 A1* | 4/2018 | Pawgi | H04L 63/0428 |
| 2018/0241561 A1* | 8/2018 | Albertson | H04L 63/06 |
| 2018/0241777 A1* | 8/2018 | Best | G06F 21/6218 |
| 2018/0276145 A1* | 9/2018 | Tsirkin | G06F 9/45558 |
| 2018/0293233 A1 | 10/2018 | Higginson et al. | |
| 2018/0293395 A1* | 10/2018 | Kato | H04L 63/0435 |
| 2018/0336363 A1* | 11/2018 | Algie | H04L 9/085 |
| 2018/0365290 A1* | 12/2018 | Kaushik | G06F 21/602 |
| 2019/0020631 A1* | 1/2019 | Leavy | H04L 9/14 |
| 2019/0026476 A1* | 1/2019 | Van Riel | G06F 12/1009 |
| 2019/0097791 A1* | 3/2019 | Hersans | G06F 12/123 |
| 2019/0116163 A1* | 4/2019 | Einarsson | G06F 21/10 |
| 2019/0158270 A1* | 5/2019 | Berti | H04L 9/3239 |
| 2019/0171829 A1* | 6/2019 | Tackabury | G06F 21/6209 |
| 2019/0173858 A1* | 6/2019 | Shin | H04L 63/08 |
| 2019/0188079 A1* | 6/2019 | Kohli | G06F 3/067 |
| 2019/0207910 A1* | 7/2019 | Darling | H04L 63/0428 |
| 2019/0229894 A1* | 7/2019 | Samid | H04L 9/085 |
| 2019/0230083 A1* | 7/2019 | Chen | H04L 63/10 |
| 2019/0303460 A1* | 10/2019 | Barbarek | G06F 16/2379 |
| 2019/0340251 A1* | 11/2019 | Peddada | H04L 9/16 |
| 2020/0004582 A1* | 1/2020 | Fornash | G06F 9/4856 |
| 2020/0028673 A1* | 1/2020 | Howe | H04L 9/0825 |
| 2020/0134199 A1* | 4/2020 | Conway | G06F 21/602 |
| 2020/0213109 A1* | 7/2020 | Perlman | G06F 16/174 |
| 2020/0250325 A1* | 8/2020 | Chong | G06F 21/6218 |
| 2020/0301748 A1* | 9/2020 | Gupta | G06F 16/27 |

* cited by examiner

GENERATING DATA MIGRATION PLAN FOR IN-PLACE ENCRYPTION OF DATA

FIELD

The present application generally relates to information technology and, more particularly, to data migration techniques.

BACKGROUND

Enterprises have different options for managing databases. For example, an enterprise may store a database on a private cloud or other type of cloud. Both options present potential security problems due to internal entities (e.g., system or database administrator of a private cloud) or external entities (e.g., cloud administrator of a cloud). Such security problems can be mitigated by encrypting the data before storing it in the database. For example, if a searchable encryption scheme is used to encrypt the data, it allows the database to handle a variety of queries directly on the encrypted data, while at the same time preventing anyone without access to a proper encryption key from viewing the data. The adoption of searchable encryption technologies is on rise.

SUMMARY

In one embodiment of the present invention, techniques for generating a data migration plan for in-place encryption of data are provided. An exemplary computer-implemented method can include receiving, from a user, a request to generate a migration plan for performing in-place encryption of data within a database, wherein the migration plan indicates periods of time in which portions of the data are to be encrypted. Such a method can also include determining a set of constraints for performing the in-place encryption and generating the migration plan based at least in part on the set of constraints. Additionally, such a method can include performing the in-place encryption of the data in accordance with the migration plan such that only a single copy of each of the portions is maintained during the in-place encryption, wherein the single copy comprises one of (i) a plaintext copy of data corresponding to the portion, and (ii) an encrypted copy of data corresponding to the portion.

An example of another embodiment of the subject matter described herein, a method includes determining a plurality of referential integrity groups, R, corresponding to a plaintext database based at least in part on a schema of the database, wherein each referential integrity group in R comprises disjoint columns of the database that are referentially related. The method includes determining a plurality of query groups, Q, based at least in part on query information corresponding to the database, wherein each query group in Q comprises columns of the database that are (i) related based at least in part on the query information and (ii) not referentially related. The method also includes determining a plurality of super groups, S, wherein each super group includes (i) one of the query groups and (ii) one or more corresponding referential integrity groups, such that at least one column in the one query group is present in each of the one or more corresponding referential integrity groups. Additionally, the method includes, for each respective group in R', Q' and S, where R'=R−S and Q'=Q−S, determining time intervals (i) when a query uses the respective group and (ii) when the respective group is not used. The method further includes generating a migration plan for performing in-place encryption of the plaintext data within the database by at least (i) assigning groups in R', Q' and S to the determined time intervals based on an expected time require to perform the encryption for each of the groups and (ii) identifying any group that cannot be assigned to one of the determined intervals.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As noted herein, the adoption of encrypting data before storing it in a database helps mitigate some security problems. Generally, the process of migrating a plaintext database to an encrypted database requires encrypting each column of the database under the encryption scheme and the corresponding encryption key chosen for it. During migration of a database, some of the queries cannot be executed on the database. For example, during the time a column is being encrypted, it cannot be used for query processing, since some of the rows will be in plaintext while other rows will be encrypted. Also, if a query uses two columns in a predicate, such as for join, then either both columns must be in plain text or both columns must be encrypted.

In order for queries to execute properly, whole columns should be encrypted in one pass, and columns which are used together in a query (such as for join operations, for example) should be encrypted together or remain in plain text.

One way to accomplish this is to stop the database server from processing any query and encrypt all of the data. However, this approach results in application downtime since applications which rely on the database cannot work until data migration is completed. The amount of downtime can be significant.

Another way to accomplish this is via database shadowing, in which a user provisions a new database server and copies the data from the old server to the new server. The data are encrypted while they are being copied and saved in the new database server. During the migration, the old server is used by the application, and when the migration is completed, a new server is used by the application. One disadvantage with this approach is that it requires a substantial amount of resources to shadow the original database (e.g., many terabytes of disk space).

Example embodiments of the subject matter described herein include techniques for generating a data migration plan for in-place encryption of data that address one or more of these issues. The data migration plan can be optimized to account for various constraints on when and how the encryption is to be performed (e.g., user-defined constraints, database integrity constraints, query constraints, etc.), and also allow the database to be operational throughout most, if not all, of the encryption process.

One or more example embodiments include analyzing various data points (such as, for example, columns to be encrypted, database schemas, regular database maintenance windows, user optimization goals, etc.) within a database and proposing an optimized migration plan for migrating from a clear text database to an encrypted database. The migration plan ensures that data satisfy certain constraints in the database. Some example embodiments also include allowing a data owner to revise the migration plan based on interactive feedback mechanism.

Figure 1:
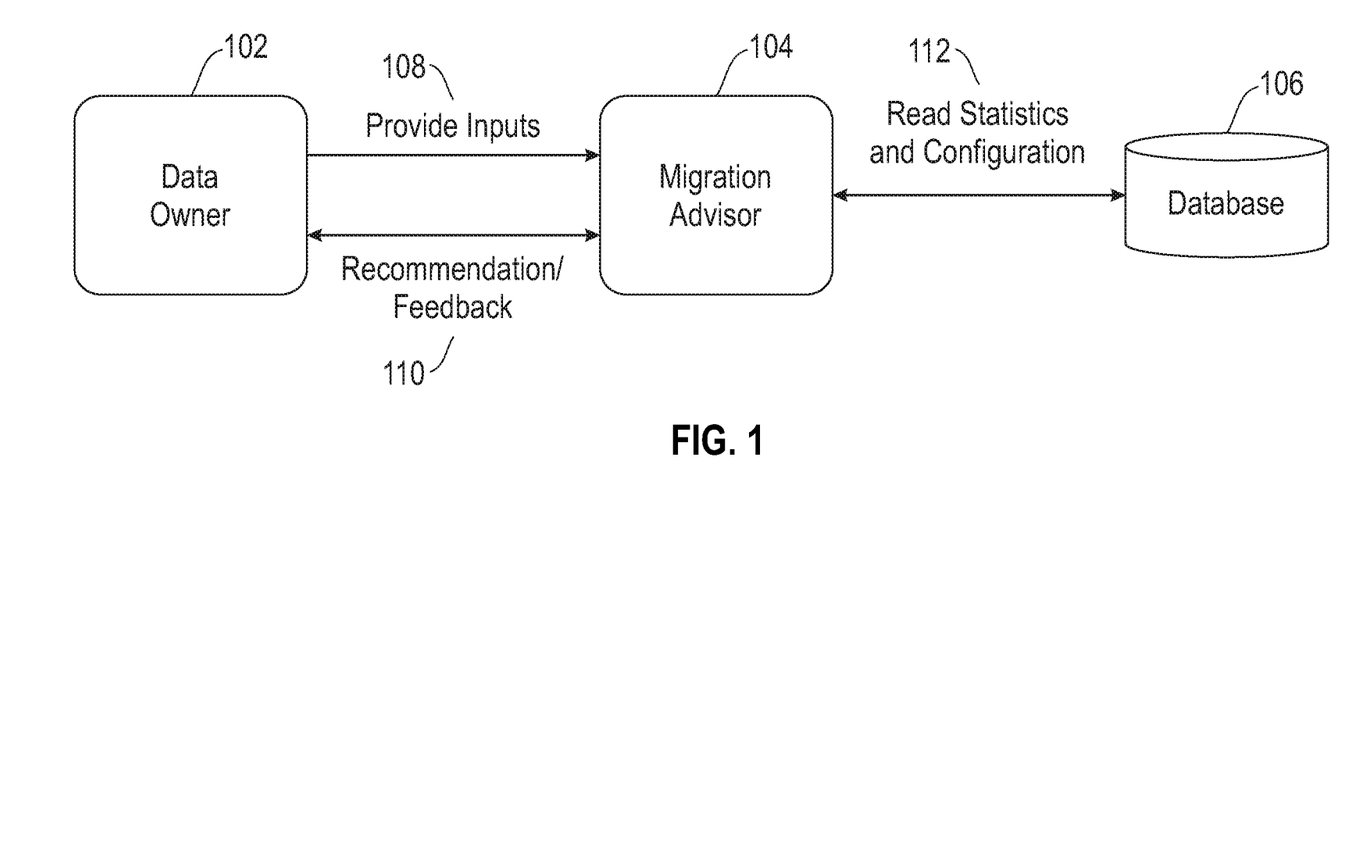
FIG. 1 is a high level flow diagram in accordance with at least one example embodiment of the subject matter described herein.

FIG. 1 depicts a high level flow diagram in accordance with at least one example embodiment. The flow diagram in FIG. 1 includes a data owner 102, a migration advisor 104 and a database 106. The data owner 102 provides various inputs 108 to migration advisor 104. The migration advisor 104 accesses 112 the database 106 (or a server associated with the database 106, for example) to gather statistics and configuration information related to the database 106. The database 106 may be, for example, a database stored in a private cloud or other type of cloud. The migration advisor 104 creates a migration plan that includes one or more recommendations for data owner 102 on how the migration is to be performed. As indicated by 110, the migration plan is provided to the data owner 102, and the owner may either approve the migration plan (for example, via user input) or may provide feedback regarding the migration plan. If the plan is accepted by the data owner 102, then the data migration may be carried out in accordance with the plan. If the data owner 102 provides some feedback, then the migration advisor 104 can revise the migration plan to account for the feedback and provide the revised plan to the data owner 102. This feedback cycle between the data owner 102 and the migration advisor 104 may repeat one or more times until the migration plan is approved by the data owner 102.

Figure 2:
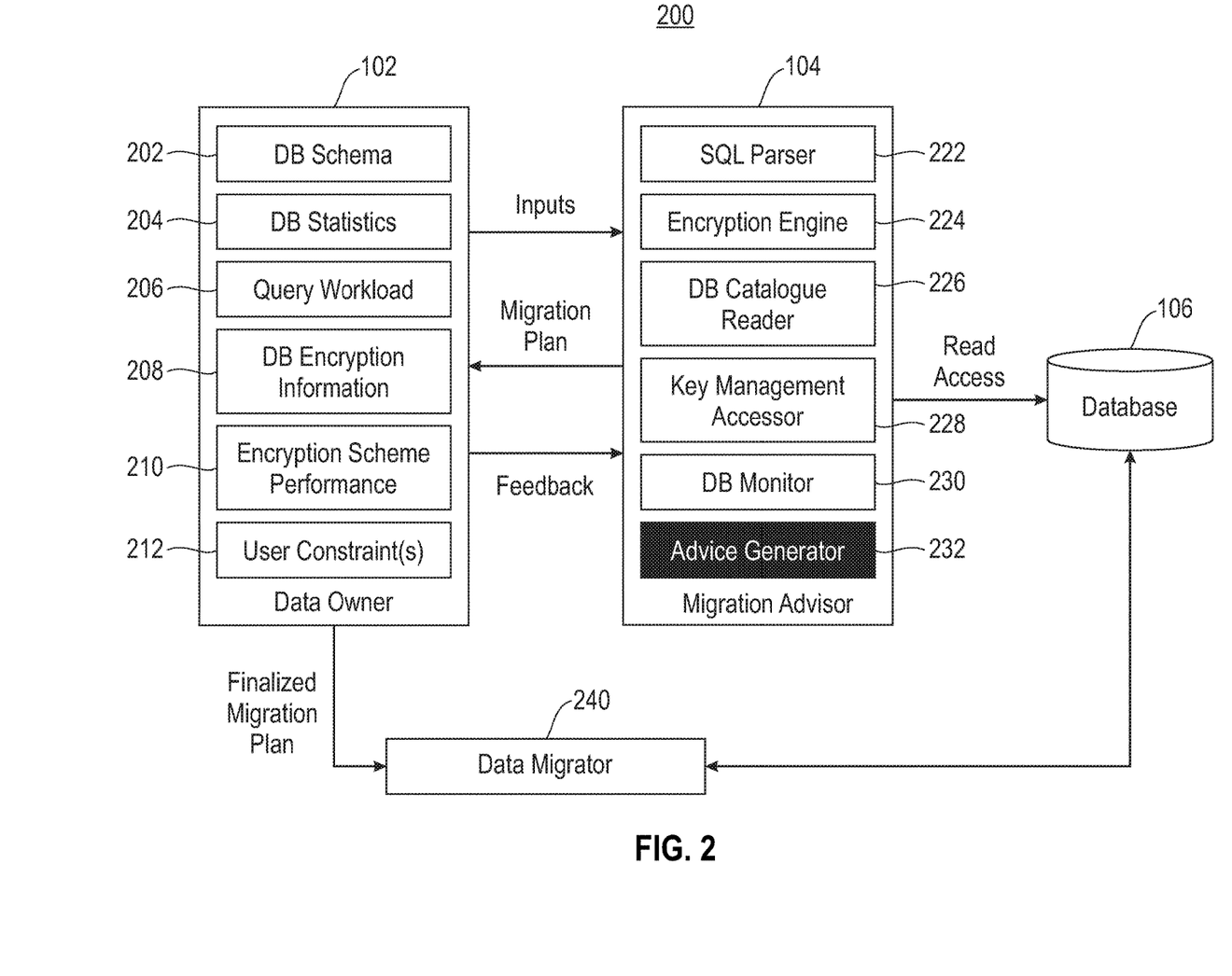
FIG. 2 is a diagram illustrating an example system framework in accordance with an example embodiment of the subject matter described herein.

FIG. 2 is a diagram illustrating a non-limiting example system framework 200 in accordance with an example embodiment of the subject matter described herein. The system framework 200 includes data owner 102, migration advisor 104, database 106 and data migrator 240. As depicted in FIG. 2, the data owner 102 provides the migration advisor 104 with various inputs. In the example framework 200, these inputs include a database (DB) schema 202, DB statistics 204, a query workload 206, DB encryption information 208, encryption scheme performance 210, and one or more user constraints 212. In at least some example embodiments, the inputs shown in FIG. 2 are not all required. For example, in some embodiments, one or more of these inputs may be excluded, set to a default value and/or automatically determined by the migration advisor 104, for example.

The DB schema 202 includes information about various tables and columns in the database 106. The DB schema 202 may provide information about the logical structure of the database, such as how the data are organized and how the relations among the data are associated. For example, the DB schema 202 information may include the referential integrity constraints that are to be applied on the data. In some example embodiments, the migration advisor 104 may determine the DB schema 202 by accessing the catalog of the database 106. In general, the database catalog stores definitions of database objects such as base tables, views (virtual tables), synonyms, value ranges, indexes, users and user groups, for example.

The DB statistics 204 includes information about one or more columns of the database. The DB statistics 204 may include, for example, information about the distribution of values in one or more columns of a table or an index. The DB statistics 204 may include multiple statistic objects wherein each object corresponds to one or more columns of the database. Each statistic object may be indicative of a header, a histogram and a correlation of values among columns (e.g., a density vector). In some example embodiments, the migration advisor 104 may read the database statistics 204 from the database itself. In at least one example embodiment, the migration advisor 204 may also compute different statistics to allow a more accurate migration plan to be generated.

The query workload 206 information indicates, for example, the number of queries that are executed by the database in a given period of time.

The query workload 206 information may include submission timestamps with the queries, which indicate the time at which the queries were submitted to database.

The query workload 206 information may include a query runtime, which indicates the time the database takes to execute the query. If the query runtime is not available, then an estimated query execution time, as output by database optimizer may also be used.

In some examples, the query workload 206 information may include weights of various queries, which indicate how important the queries are. If the query weights are not provided, it can be assumed that all queries carry equal weights.

According to one or more example embodiments, at least a part of the query workload 206 information may be determined by the migration advisor 104, such as by monitoring the database 106 over a period of time and recording all queries that are executed within that time period, for example.

The DB encryption 208 information indicates the encryption scheme for each column and corresponding key labels. In some example embodiments, two or more encryption schemes may be used, wherein at least one column is encrypted using a first encryption scheme and at least one column is encrypted using a second encryption scheme, for example. Some non-limiting examples of encryption schemes that may be used include, for example, AES (Advanced Encryption Standards), OPE (Order Preserving Encryption), RSA, Paillier Cryptosystem, etc. The DB encryption 208 information may be provided by the data owner 102.

The encryption scheme performance 210 information indicates, for example, the average time taken to encrypt a given value under the encryption scheme indicated in the DB encryption 208 information. In some examples, the encryption scheme performance 210 information can be provided by the data owner 102. In other embodiments, the migration advisor 104 may calculate it by running one or more tests on the device(s) which will perform the data encryption.

The user constraint(s) 212 may include, for example, regular maintenance windows which indicates one or more periods of time when then the database is made unavailable for query processing. Typically, these periods of time are used to perform various administrative tasks.

The user constraint(s) 212 may also include, for example, one or more periods of time when the database must be mandatorily made available for query processing. Such periods of time are usually associated with critical business processing such as, for example, payroll processing at the end of month, etc.

The user constraint(s) 212 may include, for example, one or more user optimization goals which indicate the priority of migration advisor 104 when generating the migration plan. Non-limiting examples of optimization goals include, for example, a goal to minimize the time it takes for migration of the database and a goal to migrate the data in such a manner that queries with higher weights are first run on the migrated data.

Further, in at least some example embodiments, the migration advisor 104 may monitor the database 106 to determine one or more periods of time when the database is not being used to execute any query, and/or one or more periods of time when one or more particular columns are not being used in any query being executed by the database.

The migration advisor 104 depicted in FIG. 2 comprises a number of components, including:
  SQL parser 222: This component parses the SQL queries that are being executed by the database and records the tables/columns that will be accessed to execute this query;
  Encryption engine 224: This component performs encryption and decryption of sample data to compute the encryption scheme performance in case it is not provided by the data owner;
  DB catalog reader 226: This component is used to read the database catalog which includes information such as, for example, database schema, etc.;
  Key management accessor 228: This component provides access to the keys used for encryption/decryption. This component is used by the Encryption engine 224;
  DB monitor 230: This component monitors the database 106 and records various events which include queries being executed, etc.; and
  Advice generator 232: This component generates migration plan for migration of database based on the determined and/or inputted constraints.

In a similar manner to that described above with respect to FIG. 1, the migration plan may be output to the data owner 102 for review. The data owner 102 may provide one or more rounds of feedback to the migration advisor 104, such that the migration plan is adjusted by the migration advisor 104 based on the data owner's feedback. When the migration plan is approved by the data owner 102, the finalized migration plan is provided to the data migrator 240 as depicted in FIG. 2.

According to one or more example embodiments, the data migrator 240 may then encrypt the database 106 in accordance with the finalized migration plan. The encryption performed by the data migrator 240 may be implemented in different ways (e.g., via scripts, tools, etc.). In some examples, the encryption by the data migrator 240 may include at least some manual input from a user. For example, a user may cause a script or function to be executed that encrypts a column of data at the time specified by the migration plan.

According to one or more example embodiments, the data migrator 240 reads part of database 106, encrypts it, and then places the encrypted version back in the same place. In this way, there is no shadowing as only a single copy of data is maintained at any given point of time. The migration plan ensures that after each step, the database 106 (including the migrated encrypted objects) can be used for query processing.

In one or more example embodiments, the advice generator 232 generates the migration plan such that one or more whole columns are encrypted in a single step. Also, dependent columns may be encrypted together to the extent that is possible. Encrypting entire columns avoids columns that include both plaintext and encrypted data, thus avoiding potential disruptions to the availability of the database. Also, in one or more embodiments, the advice generator 232 encrypts a foreign key and a referenced column together which also helps avoid disruptions in query processing.

In at least one example embodiment, the advice generator 232 may determine at least in part on a query log: time windows when a particular column is not used (including regular maintenance windows), compute times required for encrypting particular column(s) (e.g., based on the encryption performance and data statistics), and time windows long enough to accommodate the encryption of particular columns. If no time windows are available for a given column that are long enough to accommodate the given column, then the time window that best fits the given column can be determined. A user (e.g., data owner) can then be notified of the additional time needed to encrypt the given column.

According to at least one example embodiment, a process for generating a migration plan includes determining one or more referential integrity groups, $R_1, R_2, \ldots R_M$ (collectively, R), wherein each referential integrity group includes columns in the database that refer to other columns in the group and/or are referred to by other columns in the group, and wherein the columns in each group are disjoint. The referential integrity groups, R, may be determined, for example, based at least in part on the DB schema 202 information.

Additionally, the process also includes determining one or more query groups, $QG_1, QG_2, \ldots QG_O$ (collectively, Q), wherein each query group includes columns which are related in query but not in referential integrity. It is noted that the same column can be part of different query groups. The query groups, Q, may be determined, for example, based on the query workload 206 information.

The process also includes determining one or more super groups, $S_1, S_2, \ldots S_P$ (collectively, S), wherein each super group includes groups from R and Q, such that query groups in a super group join the referential integrity groups.

Let $R'=R-S$ and $Q'=Q-S$. The process includes tracking, for each group in S, R' and Q', queries that use the columns in the group during execution, and the time intervals when none of the columns in the group is used. The time intervals when the group is not used may correspond to, for example, all maintenance windows and time windows when no query associated with the group is running minus any mandatory time windows.

Each group from R', Q' and S is assigned to a time interval such that:
1) Only one group is assigned to a given time interval;
2) The time interval assigned to a given group is greater than the expected time for encryption of that group (for example, expected time of encryption=number of values in the group*encryption time per value); and
3) Satisfy other constraints, such as, minimizing time taken for the migration or prioritizing columns which are used in higher weight queries to be migrated earlier, for example.

Each group in R', Q' and S that was not assigned to a time interval may be denoted R", Q", S", respectively.

For S", the process separates out the groups from R and Q. Then it is checked if these separated groups can be assigned independently to any of the remaining time intervals. If sub-groups of S" are assigned for migration to different time intervals, then certain queries (which require columns from S") will not be able to execute on the migrated database until all sub-groups of S" have been migrated. In some examples, the process notifies the user about the queries that will be affected by this staggered migration of S".

For each group in R" and Q", the user is provided with information on why the group cannot be moved in any single available window of time.

Additionally, for each group of R" and Q", the user may be notified about a time window during which the group can be migrated. Such time window will include at least one period of time when some queries which require columns from the group being migrated may be submitted to the database for execution, but these queries cannot be executed since the group is under migration.

The user (e.g., data owner 102) then provides feedback, which may include, for example, assigning one of the groups to a particular interval, providing a sequence of queries, such that columns used by these queries are migrated first, etc. The groups are then assigned in a way that satisfies the user's feedback. For any columns that cannot be migrated in the given time interval, the process generates a migration plan which minimizes the database and/or application down time, and outputs the migration plan, wherein each column is assigned to a time interval such that the column should be encrypted in that time interval. For example, the migration plan can be output to a file, via a graphical user interface, etc.

The migration plan may be used in different ways. For example, in some examples, the migration plan can be provided as input to various scripts or tools that cause at least some of the columns to be encrypted at the time specified by the migration plan. In at least one example, the outputted migration plan may be used to encrypt one or more columns of the database manually by a user, such as via the user executing a script or calling a function to encrypt the columns according to the times in the migration plan. As such, various example embodiments allow the migration plan to be used to encrypt columns of the database automatically, semi-automatically and/or manually.

A non-limiting example showing how the various groups described above are determined is now described. For this example, assume a database has the following scheme:

Table A includes columns A1, A2, A3, A4, A5, A6, A7, A8, A9, A10
Table B includes columns B1, B2, B3, B4, B5, B6, B7, B8, B9, B10
Table C includes columns C1, C2, C3, C4, C5, C6, C7, C8, C9, C10
Table D includes columns D1, D2, D3, D4, D5, D6, D7, D8, D9, D10

Additionally, assume the following referential integrity constraints:
B1 refers to A1
C1 refers to B1
C2 refers to B2
D2 refers to B2
B3 refers to A3
D3 refers to B3
C4 refers to A4
D4 refers to A4
C5 refers to B5
C6 refers to A6

For this example, also assume the following query constraints are not present in referential integrity constraints (e.g., columns not linked by referential integrity constraints being joined in a query):
A1 joins B2
A6 joins B5
A7 joins B7
A8 joins B8

Based on the above, the referential integrity groups, R, are as follows:
R1={A1, B1, C}
R2={B2, C2, D2}
R3={A3, B3, D3}
R4={A4, C4, D4}
R5={B5, C5}
R6={A6, C6}
R={R1, R2, R3, R4, R5, R6}

The query groups, Q, for the example above are:
QG1={A1, B2}
QG2={A6, B5}
QG3={A7, B7}
QG4={A8, B8}
Q={QG1, QG2, QG3, QG4}

If the columns of a given query group are part of different referential integrity groups, then the query group and the corresponding referential integrity groups are made part of the same super group. Accordingly, in this example, the super groups are:
S1={R1∪R2∪QG1}={A1, B1, C1, B2, C2, D2}
S2={R5∪R6∪QG2}={B5, C5, A6, C6}
S={S1, S2}

Thus, R'=R−S={R3, R4} and Q'=Q−S={QG3, QG4}.

Although the techniques herein are generally described in the context of encryption, it is to be appreciated that the techniques are also applicable to other transformations of data (such as, migrating data from one format to another format, for example).

Figure 3:
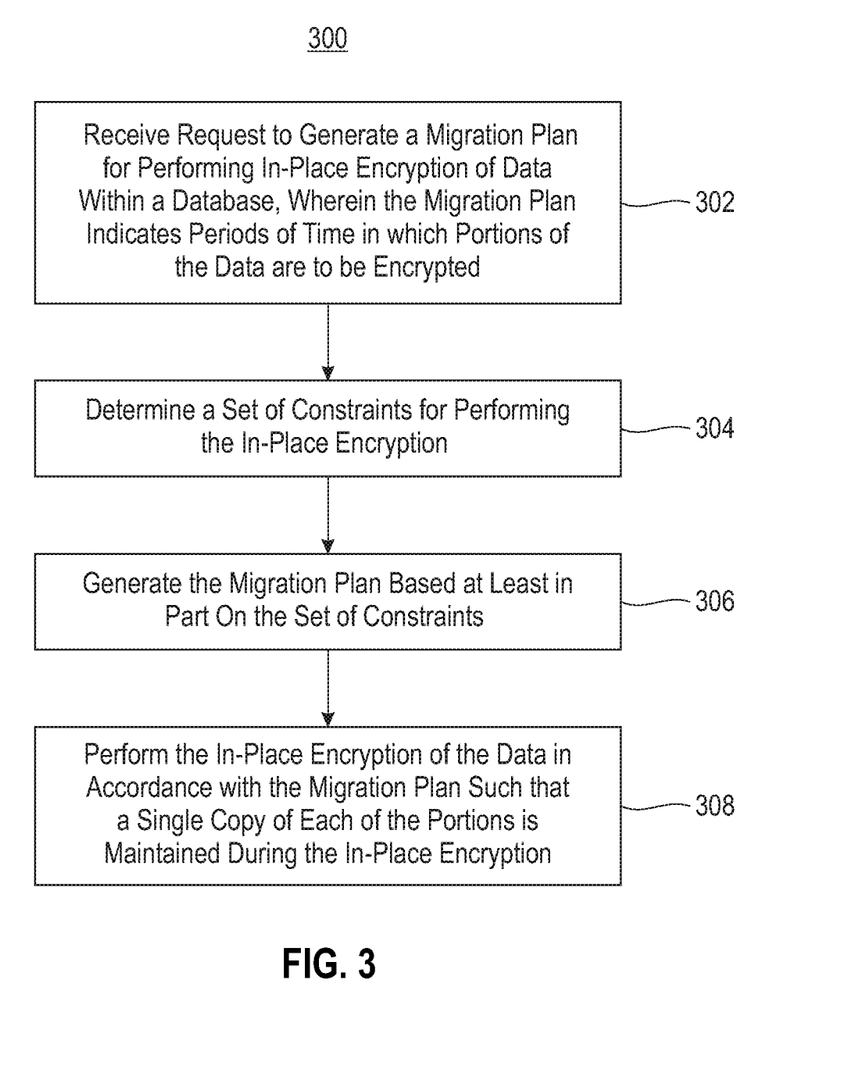
FIG. 3 is a flow diagram illustrating techniques according to an example embodiment of the subject matter described herein.

FIG. 3 is a flow diagram illustrating a process 300 according to an embodiment of the present invention. Step 302 of process 300 includes receiving, from a user, a request to generate a migration plan for performing in-place encryption of data within a database, wherein the migration plan indicates periods of time in which portions of the data are to be encrypted. Step 304 of process 300 includes determining a set of constraints for performing the in-place encryption. Step 306 of process 300 includes generating the migration plan based at least in part on the set of constraints. Optionally, process 300 includes step 308 which includes performing the in-place encryption of the data in accordance with the migration plan such that only a single copy of each of the portions is maintained during the in-place encryption, wherein the single copy comprises one of (i) a plaintext copy of data corresponding to said portion, and (ii) an encrypted copy of data corresponding to said portion.

The set of constraints may correspond to at least one of (i) one or more characteristics associated with the database and (ii) one or more characteristics associated with an encryption scheme to be used to perform said in-place encryption. The one or more characteristics associated with the database may include at least one of (i) a schema of the database, (ii) statistical information related to one or more columns of the database, and (iii) a query workload associated with said database. Step 304 of determining may include at least one of: determining the schema from a catalogue of the database; accessing the database to compute the statistical information; and monitoring the database over one or more periods of time to determine the query workload. At least one of the constraints may specify that related columns of the database are to be encrypted together, wherein the one or more characteristics associated with the database indicate the related columns. The related columns may include at least one of (i) columns having a referential relationship and (ii) columns having a query relationship. At least one of the characteristics associated with the encryption scheme may include an average time to encrypt a value using the encryption scheme. The request may include one or more of (i) at least one of the characteristics associated with the database and (ii) at least one of the characteristics associated with the encryption scheme. At least one of the constraints may be based on one or more of (i) one or more maintenance windows, (ii) one or more periods of time during which the database is required to be operational, and (iii) an optimization goal for said in-place encryption. The optimization goal may include one or more of (i) minimizing a time for performing said in-place encryption and (ii) prioritizing in-place encryption of data based on query weights. The process 300 may include outputting said generated migration plan to a user; receiving one or more additional factors from said user in response to said outputting; and adjusting said migration plan based at least in part on the one or more additional factors. Step 306 of generating may include: determining a set of available time windows in which the in-place encryption can be performed; and assigning one or more of the portions of the data to at least a subset of the available time windows. Step 306 of generating may include: determining that the in-place encryption for a given portion of the data cannot be performed within an available time window in the set; and indicating the additional time required to perform the in-place encryption for the given portion of the data in the migration plan. The database may include at least one of (i) a private database and (ii) a cloud database.

According to another example embodiment, a process may include determining a plurality of referential integrity groups, R, corresponding to a plaintext database based at least in part on a schema of the database, wherein each referential integrity group in R comprises disjoint columns of the database that are referentially related; determining a plurality of query groups, Q, based at least in part on query information corresponding to the database, wherein each query group in Q comprises columns of the database that are (i) related based at least in part on the query information and (ii) not referentially related; determining a plurality of super groups, S, wherein each super group includes (i) one of the query groups and (ii) one or more corresponding referential integrity groups, such that at least one column in the one query group is present in each of the one or more corresponding referential integrity groups; for each respective group in R', Q' and S, wherein R'=R−S and Q'=Q−S, determining time intervals (i) when a query uses the respective group, and (ii) when the respective group is not used; and generating a migration plan for performing in-place encryption of the plaintext data within the database by at least (i) assigning groups in R', Q' and S to the determined time intervals based on an expected time required to perform the encryption for each of the groups and (ii) identifying any group that cannot be assigned to one of the determined intervals. The process may further include outputting an indication of the groups that cannot be assigned to one of the determined intervals to a user, and prior to said performing, modifying the migration plan based on user input received in response to said outputting.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
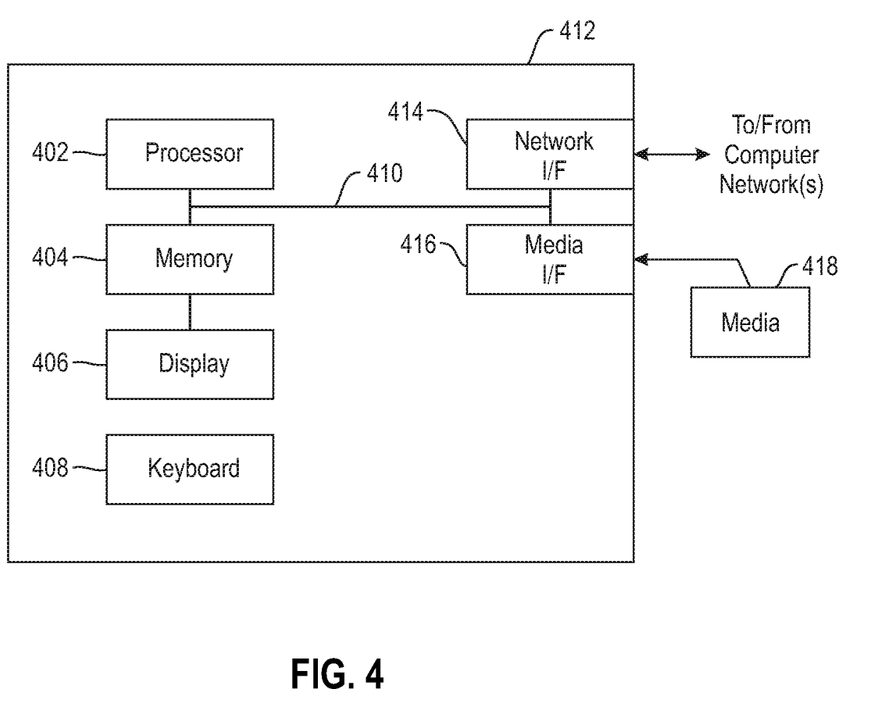
FIG. 4 is a system diagram of an exemplary computer system on which at least one embodiment of the subject matter described herein can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
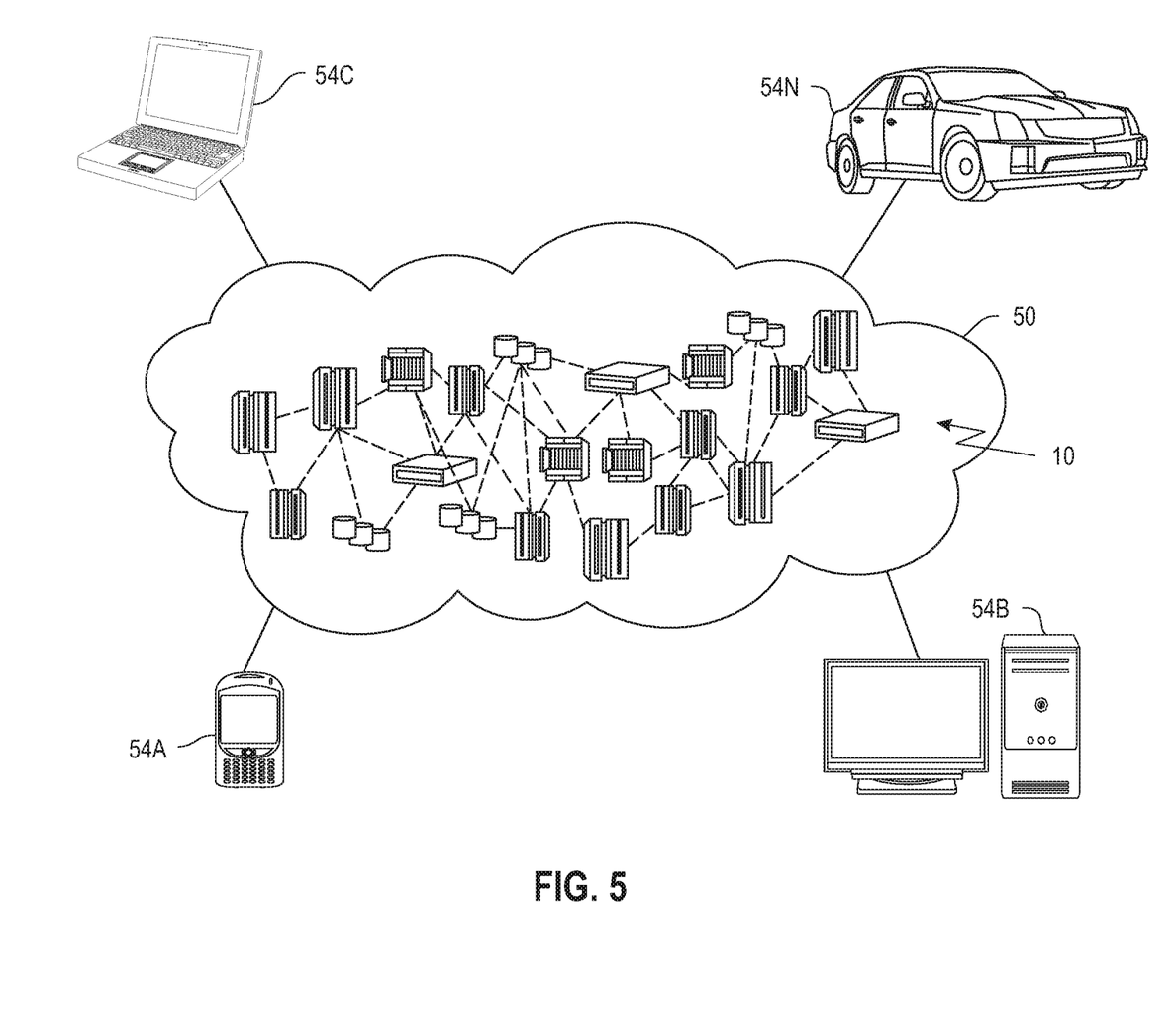
FIG. 5 depicts a cloud computing environment according to an embodiment of the subject matter described herein.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
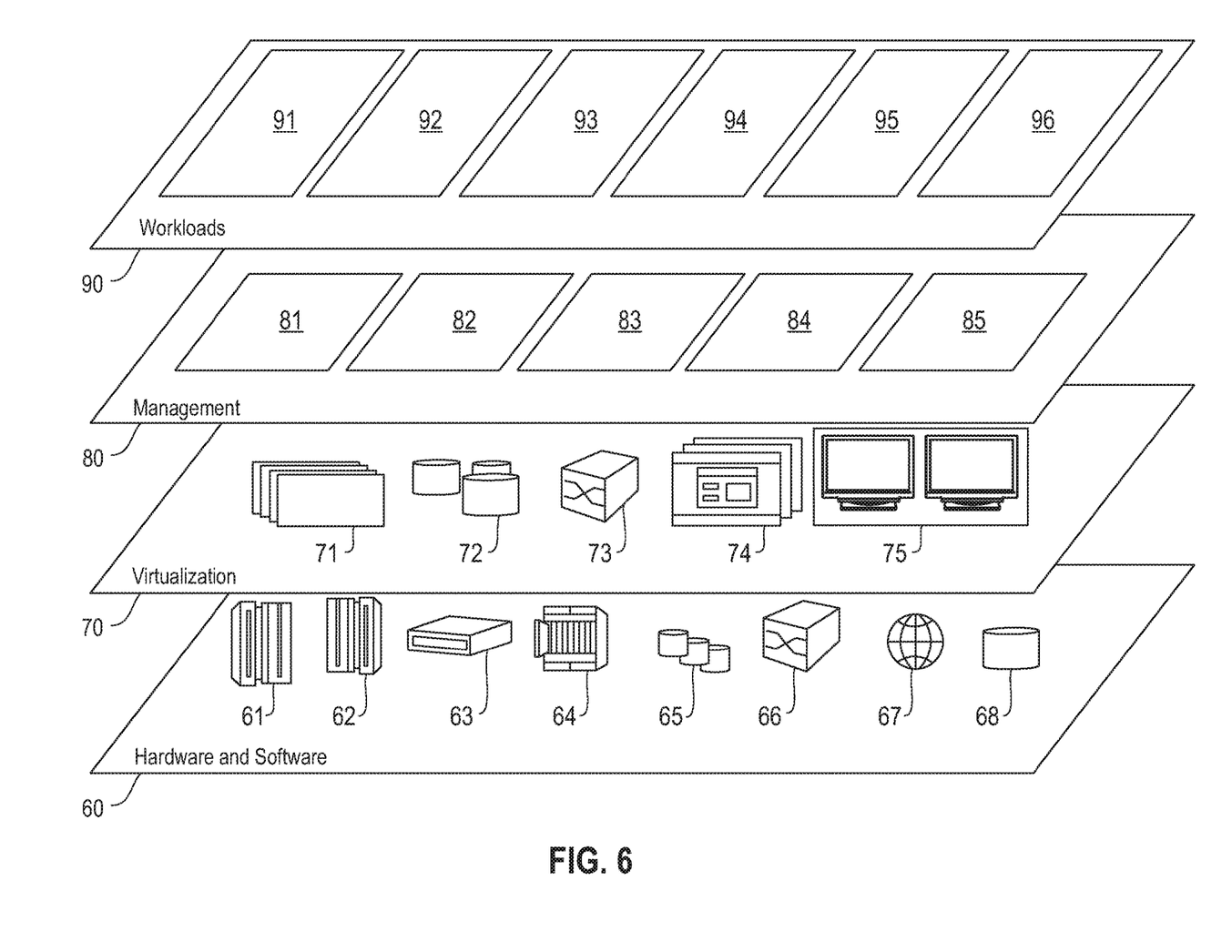
FIG. 6 depicts abstraction model layers according to an embodiment of the subject matter described herein.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a data migration plan for in-place encryption of data 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, allowing databases to be migrated to use a searchable encryption scheme with minimal downtime. Also, at least one embodiment of the present invention may provide a beneficial effect such as, for example, assisting a database owner in planning in-place migration of database from plain text data to encrypted data based on goals and/or constraints specified by the data owner. Further, at least one embodiment of the present invention may provide a beneficial effect such as, for example, efficiently encrypting a plaintext database without requiring database shadowing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, from a user, a request to generate a migration plan for performing in-place encryption of data within a database, wherein the migration plan indicates periods of time in which portions of the data are to be encrypted;

determining a set of constraints for performing the in-place encryption;

generating the migration plan based at least in part on the set of constraints, wherein the generating comprises: determining a set of available time windows in which the in-place encryption can be performed and assigning one or more of the portions of the data to at least a subset of the available time windows; and performing the in-place encryption of the data in accordance with the migration plan such that a single copy of each of the portions is maintained during the in-place encryption, wherein the single copy comprises one of (i) a plaintext copy of data corresponding to said portion and (ii) an encrypted copy of data corresponding to said portion;

wherein the method is carried out by at least one computing device.

2. The computer-implemented method of claim 1, wherein the set of constraints corresponds to at least one of (i) one or more characteristics associated with the database and (ii) one or more characteristics associated with an encryption scheme to be used to perform said in-place encryption.

3. The computer-implemented method of claim 2, wherein the one or more characteristics associated with the database comprise at least one of (i) a schema of the database, (ii) statistical information related to one or more columns of the database, and (iii) a query workload associated with said database.

4. The computer-implemented method of claim 3, wherein said determining comprises at least one of (i) determining the schema from a catalogue of the database, (ii) accessing the database to compute the statistical information, and (iii) monitoring the database over one or more periods of time to determine the query workload.

5. The computer-implemented method of claim 2, wherein at least one of the constraints specifies that related columns of the database are to be encrypted together, and wherein the one or more characteristics associated with the database indicate the related columns.

6. The computer-implemented method of claim 5, wherein the related columns comprise at least one of (i) columns having a referential integrity relationship and (ii) columns having a query relationship.

7. The computer-implemented method of claim 2, wherein at least one of the characteristics associated with the encryption scheme comprises an average time to encrypt a value using the encryption scheme.

8. The computer-implemented method of claim 2, wherein the request comprises one or more of (i) at least one of the characteristics associated with the database and (ii) at least one of the characteristics associated with the encryption scheme.

9. The computer-implemented method of claim 1, wherein at least one of the constraints is based on one or more of (i) one or more maintenance time windows during which the database is made unavailable for query processing, (ii) one or more periods of time during which the database is required to be operational, and (iii) at least one optimization goal for said in-place encryption.

10. The computer-implemented method of claim 9, wherein at least one of the constraints is provided based at least in part on user input.

11. The computer-implemented method of claim 9, wherein said at least one optimization goal comprises one or more of (i) minimizing a time for performing said in-place encryption and (ii) prioritizing in-place encryption of data based on query weights.

12. The computer-implemented method of claim 1, comprising:

outputting said generated migration plan to a user;

receiving one or more additional factors from said user in response to said outputting; and adjusting said migration plan based at least in part on the one or more additional factors.

13. The computer-implemented method of claim 1, wherein said generating comprises:

determining that the in-place encryption for a given portion of the data cannot be performed within an available time window in the set; and indicating one or more of (i) the additional time required to perform the in-place encryption for the given portion of the data in the migration plan and (ii) queries, from a query workload, that are likely to be affected during the additional time required to perform the in-place encryption for the given portion of the data.

14. The computer-implemented method of claim 1, wherein the database comprises at least one of (i) a private database and (ii) a cloud database.

15. The computer-implemented method of claim 1, wherein software is provided as a service in a cloud environment.

16. A computer program product comprising a computer readable storage medium having program instructions embodied therewith, the program instructions executable by at least one computing device to cause the at least one computing device to perform at least:

receiving, from a user, a request to generate a migration plan for performing in-place encryption of data within a database, wherein the migration plan indicates periods of time in which portions of the data are to be encrypted;

determining a set of constraints for performing the in-place encryption;

generating the migration plan based at least in part on the set of constraints, wherein the generating comprises: determining a set of available time windows in which the in-place encryption can be performed and assigning one or more of the portions of the data to at least a subset of the available time windows; and performing the in-place encryption of the data in accordance with the migration plan such that a single copy of each of the portions is maintained during the in-place encryption, wherein the single copy comprises one of (i) a plaintext copy of data corresponding to said portion, and (ii) an encrypted copy of data corresponding to said portion.

17. A system comprising:

a memory; and at least one processor operably coupled to the memory and configured for:

receiving, from a user, a request to generate a migration plan for performing in-place encryption of data within a database, wherein the migration plan indicates periods of time in which portions of the data are to be encrypted;

determining a set of constraints for performing the in-place encryption;

generating the migration plan based at least in part on the set of constraints, wherein the generating comprises: determining a set of available time windows in which the in-place encryption can be performed and assigning one or more of the portions of the data to at least a subset of the available time windows; and performing the in-place encryption of the data in accordance with the migration plan such that a single copy of each of the portions is maintained during the in-place encryption, wherein the single copy comprises one of (i) a plaintext copy of data corresponding to said portion, and (ii) an encrypted copy of data corresponding to said portion.

18. The system of claim 17, wherein the set of constraints corresponds to at least one of (i) one or more characteristics associated with the database and (ii) one or more characteristics associated with an encryption scheme to be used to perform said in-place encryption.

19. The system of claim 18, wherein the one or more characteristics associated with the database comprise at least one of (i) a schema of the database, (ii) statistical information related to one or more columns of the database, and (iii) a query workload associated with said database.

20. A computer-implemented method, comprising:

receiving, from a user, a request to generate a migration plan for performing in-place encryption of data within a database, wherein the migration plan indicates periods of time in which portions of the data are to be encrypted;

determining a set of constraints for performing the in-place encryption, wherein at least one of the constraints specifies that related columns of the database are to be encrypted together;

generating the migration plan based at least in part on the set of constraints; and performing the in-place encryption of the data in accordance with the migration plan such that a single copy of each of the portions is maintained during the in-place encryption, wherein the single copy comprises one of (i) a plaintext copy of data corresponding to said portion and (ii) an encrypted copy of data corresponding to said portion;

wherein the method is carried out by at least one computing device.

* * * * *